United States Patent
Eldredge et al.

(10) Patent No.: US 6,775,223 B2
(45) Date of Patent: Aug. 10, 2004

(54) SYSTEMS FOR CONTROLLING STORAGE DEVICE EMITTERS

(75) Inventors: Kenneth J. Eldredge, Boise, ID (US); Giulio Ricotti, Broni (IT); Michael C. Allyn, Boise, ID (US); Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

(21) Appl. No.: 10/051,476

(22) Filed: Jan. 17, 2002

(65) Prior Publication Data

US 2003/0133396 A1 Jul. 17, 2003

(51) Int. Cl.[7] .............................................. G11B 7/00
(52) U.S. Cl. ....................................................... 369/126
(58) Field of Search ................................. 369/126, 101, 369/116, 100; 250/251, 310, 492.3; 365/151, 218, 237, 118, 128

(56) References Cited

U.S. PATENT DOCUMENTS 6,617,597 B2 * 9/2003 Hilton ...................... 250/492.3
6,704,267 B2 * 3/2004 Davidson ..................... 369/101
6,735,163 B2 * 5/2004 Marshall ...................... 369/126

* cited by examiner

Primary Examiner—Thang V. Tran (57) ABSTRACT

Memory storage devices that employ atomic resolution storage technology are provided. A preferred memory storage device includes a storage medium that defines one or more coverage areas. Each of the coverage areas incorporates a storage area that is configurable in one of a plurality of structural states. Typically, the structural states represent information stored in the storage area. Electron beam emitters electrically communicate with the storage medium, with the storage medium and the emitters being configured to move relative to each other. So configured, each emitter is capable of providing a beam of electrons to a respective one of the coverage areas. The memory storage device also includes a first current source that selectively electrically communicates with at least one of the emitters. Additionally, a control system electrically communicates with the first current source that facilitates a controlled current flow from the first current source to the at least one emitter. Methods and computer readable-media also are provided.

20 Claims, 7 Drawing Sheets

SYSTEMS FOR CONTROLLING STORAGE DEVICE EMITTERS

BACKGROUND OF THE INVENTION

1. Field of the Invention

The present invention generally relates to data storage and, more specifically, to systems and methods for controlling emitters of data storage devices employing atomic resolution storage (ARS).

2. Background of the Invention

The apparent insatiability of consumers for higher capacity, higher speed memory storage devices has led to the development of memory storage techniques such as atomic resolution storage (ARS). As is known, a storage device employing ARS technology includes a number of electron emitters, such as field emitters, for example, that are adapted to write data to and read data from various storage areas of a storage medium.

During operation, an electron beam current is extracted from an emitter towards a corresponding storage area. Writing of data from an emitter to a storage area is accomplished by temporarily increasing the power density of the electron beam current to modify the structural state of the surface of the storage area. In contrast, reading data from the storage area is accomplished by observing the effect of the storage area on the electron beam of the emitter, or the effect of the electron beam on the storage area. More specifically, reading typically is accomplished by collecting secondary and/or backscattered electrons when an electron beam, i.e., an electron beam with a lower power density than that of the electron beam utilized for writing data to the storage area, is applied to the storage medium.

An ARS storage medium is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area, in response to an electron beam, depending upon the current structural state of that storage area. Thus, by measuring the number of secondary and backscattered electrons, the structural state of the storage area and, therefore, the data stored by the storage area, may be determined.

Emitters utilized in ARS generally may be characterized as electrically noisy components. This characterization may be due, at least in part, through the scale of these components and/or the typically low currents that are associated with these components. So configured, these emitters may tend to facilitate extraction of spurious electron being currents when utilizing a level currents source.

Therefore, there is a need for improved devices, systems and methods that address these and/or other shortcomings of the prior art.

SUMMARY OF THE INVENTION

Briefly described, the present invention relates to atomic resolution storage (ARS) techniques. In this regard, embodiments of the present invention may be construed as providing memory storage devices that employ, at least in part, ARS technology. A preferred embodiment of the memory storage device includes a storage medium that defines one or more coverage areas. Each of the coverage areas incorporates a storage area that is configurable in one of a plurality of structural states. Typically, the structural states represent information stored in the storage area. Electron beam emitters electrically communicate with the storage medium, with the storage medium and the emitters being configured to move relative to each other. So configured, each emitter is capable of providing a beam of electrons to a respective one of the coverage areas.

The aforementioned embodiment of the memory storage device also includes a first current source that selectively electrically communicates with at least one of the emitters. Additionally, a control system electrically communicates with the first current source. The control system facilitates a controlled current flow from the first current source to the at least one emitter so as to enable the at least one emitter to provide a beam of electrons to a respective one of the coverage areas.

Some embodiments of the present invention may be construed as providing methods for providing current to an emitter of a memory storage device. In a preferred embodiment, the method includes the steps of providing a first current source and a first current mirror electrically communicating with the first current source, and controlling a current flow from the first current source to an emitter. Preferably, controlling the current flow is facilitated by providing current from the first current source to the first current mirror, and selectively providing current from the first current mirror to the emitter.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
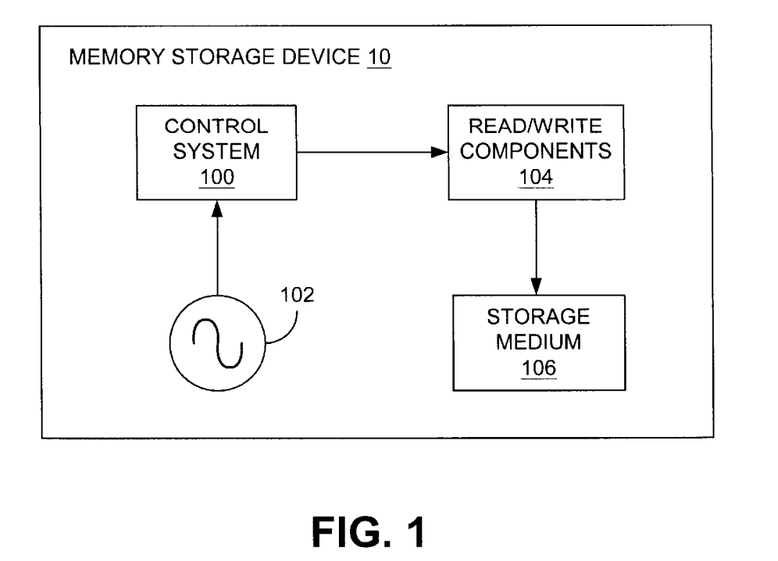
FIG. 1 is a schematic diagram of a preferred embodiment of the memory storage device of the present invention.

Reference will now be made to the drawings wherein like numerals indicate corresponding parts throughout the several views. As shown in FIG. 1, a preferred embodiment of the memory storage device 10 of the present invention includes a control system 100. Control system 100 electrically communicates with a current source 102. Control system 100 provides current from current source 102 to read/write components 104 so as to enable reading of data from and/or writing of data to storage medium 106. As described in detail hereinafter, memory storage device 10 utilizes ARS technology for the storage and retrieval of data.

Figure 2:
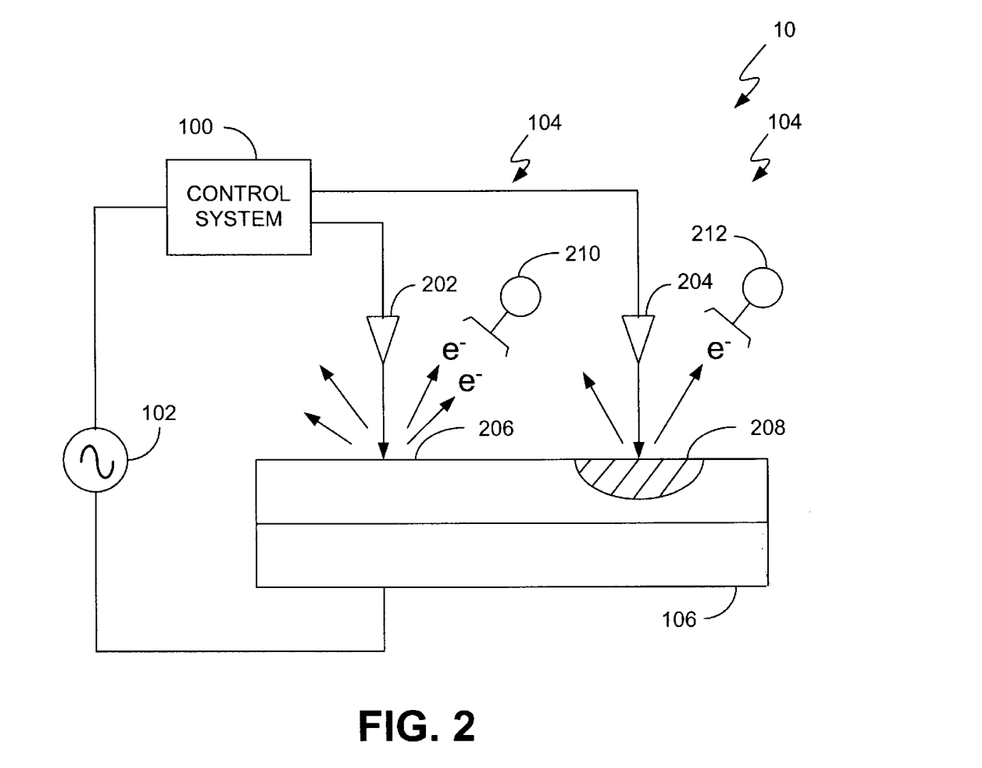
FIG. 2 is a schematic diagram illustrating emitters reading from the storage medium of FIG. 1

FIG. 2 schematically depicts a preferred embodiment of memory storage device 10 that employs ARS technology. In FIG. 2, representative emitters 202 and 204, e.g., field emitters, are shown reading from storage medium 106. In particular, emitter 202 is reading from storage area 206 and emitter 204 is reading from storage area 208. Storage areas 206 and 208 are provided with different structural states, as described hereinbefore. So provided, when electrons provided from a source, e.g., current source 102, are extracted from the emitters and into the respective storage areas, a different number of secondary electrons and/or backscattered electrons may be detected relative to each storage area. Detection of the secondary and/or backscattered electrons may be accomplished by electron collectors, e.g., collectors 210 and 212. As utilized herein, the term "read/write components" may be used to refer to an emitter(s) and/or an emitter(s) and its associated collector(s). Additionally, the term "emitter" is utilized herein as referring to any emitter configuration, such as a field emitter, ballistic emitter, quasi-ballistic emitter, flat emitter, etc.

In operation, the magnitude of a signal current collected by the electron collectors is monitored. Based upon the determined magnitude, the structural state of and, therefore, the data stored in the storage area may be identified. Typically, the data stored in a given storage area corresponds to a bit. It should be noted that the difference in the number of secondary electrons and/or backscattered electrons collected from one storage area, as compared to a storage area having a different structural state, may be greater or lesser depending upon the type of material and/or the type of modification made to the material.

Figure 3:
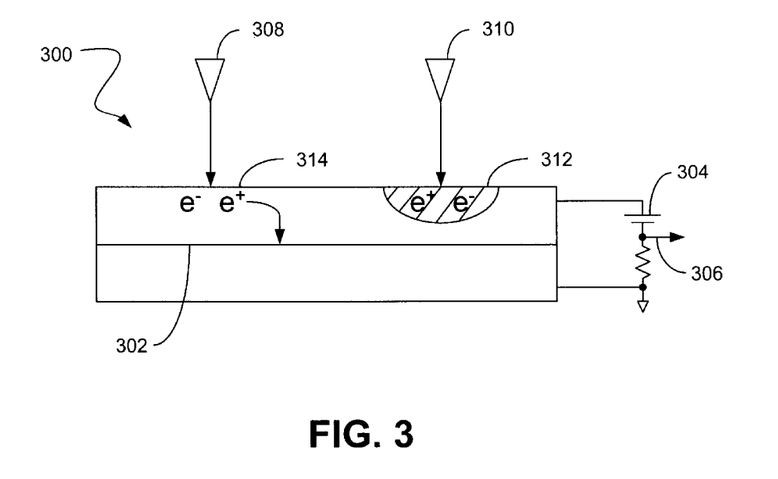
FIG. 3 is a schematic diagram illustrating emitters reading from the storage medium of FIG. 1.
Figure 4:
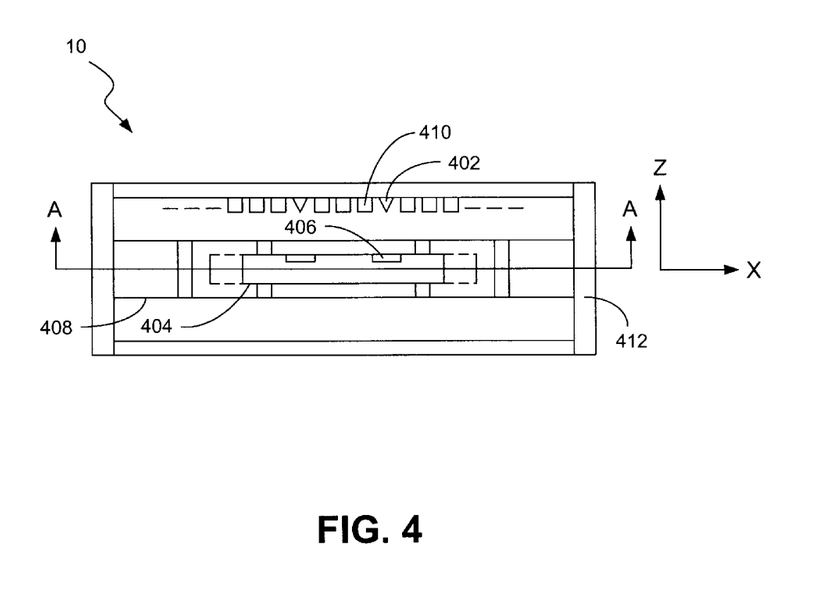
FIG. 4 is a schematic diagram illustrating a preferred embodiment of the memory storage device of FIG. 1.
Figure 5:
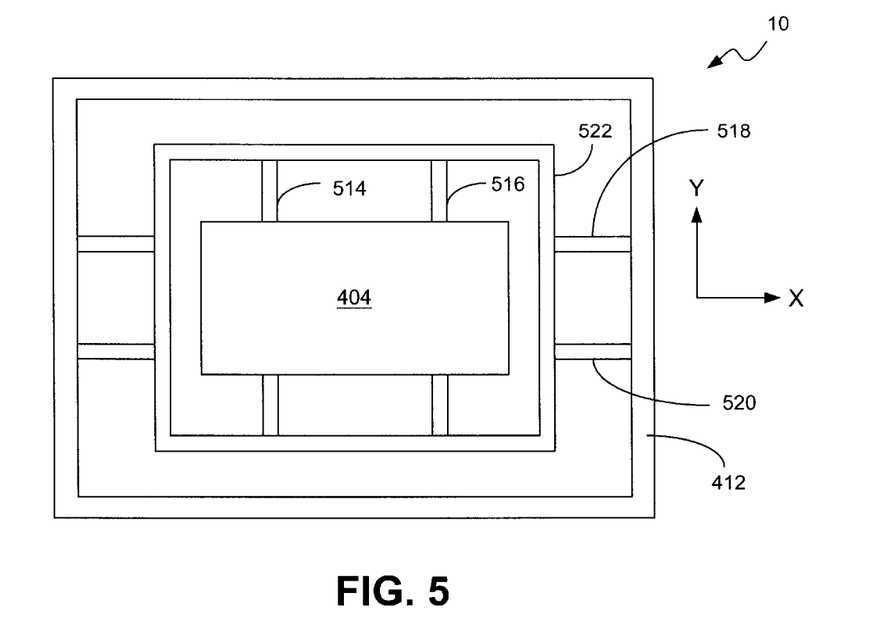
FIG. 5 is a schematic diagram illustrating the memory storage device of FIG. 4, as viewed along section line A—A.

Referring now to FIGS. 3 through 5, other embodiments of ARS systems that may implement the present invention will be described in greater detail. These figures are disclosed and described in U.S. Pat. No. 5,557,596, which is hereby incorporated by reference in its entirety. It should be noted, however, that the ARS systems shown and described herein are not the only ARS systems to be utilized with the present invention. To the contrary, the present invention may be utilized with various types and configurations of ARS systems provided that such a system is capable of writing data to and/or reading data from a storage medium.

FIG. 3 schematically depicts a technique for writing data to and/or reading data from an ARS storage area. As shown in FIG. 3, storage medium 300 is based on a diode structure, which may be a PN junction, a Schottky barrier, or any other type of electronic valve. Data is stored by locally altering the surface of the diode in such a way that collection efficiency for minority carriers generated by the altered region is different from that of an unaltered region. The collection efficiency for minority carriers is defined as the fraction of minority carriers generated by the instant electrons which are swept across the diode junction 302 when it is biased by an external circuit 304 to cause a signal current 306 to flow in the external circuit. Although FIG. 3 illustrates a preferred external circuit 304, it will be appreciated that this circuit is provided for purposes of example only.

In operation, the emitters 308 and 310 emit narrow beams of electrons onto the surface of the diode 300. The incident electrons excite electron-hole pairs near the surface of the diode. Because the diode is reverse-biased by the external circuit 304, minority carriers that are generated by the incident electrons are swept toward the diode junction 302. Electrons that reach the junction 302 are then swept across the junction. Accordingly, minority carriers that do not recombine with majority carriers before reaching the junction are swept across the junction, causing a current flow in the external circuit 304.

Writing to the diode 300 is accomplished by increasing the power density of the electron beam enough to locally alter the physical properties of the diode. This alteration affects the number of minority carriers swept across the junction 302 when the same area is radiated with a lower power density (read) electron beam. For instance, the recombination rate in a written area 312 could be increased relative to an unwritten area 314 so that the minority carriers generated in the written area 312 have an increased probability of recombining with minority carriers before they have a chance to reach and cross the junction 302. Hence, a smaller current flows in the external circuit 304 when the read electron beam is incident upon a written area 312 than when it is incident upon an unwritten area 314. Conversely, it is also possible to start with a diode structure having a high recombination rate and to write bits by locally reducing the recombination rate. In such an embodiment, the magnitude of the current resulting from the minority carriers depends upon the state of the storage area and the current continues the output signal to indicate the bit stored.

FIGS. 4 and 5 illustrate an embodiment of memory storage device 10. In this regard, FIG. 4 shows a side, cross-sectional view of memory storage device 10, which includes a number of field emitters 402, a storage medium 404 that incorporates a number of storage areas 406, and a micromover 408 that scans the storage medium with respect to the field emitters or vice versa. In a preferred embodiment, each storage area 406 is responsible for storing one bit of information. As mentioned hereinbefore, the field emitters are responsible for reading data from and/or writing data to the storage areas by utilizing electron beams. Thus, field emitters suitable for the present invention preferably are of the type that produce electron beams which are narrow enough to achieve the desired bit density of the storage medium, and which provide the power density of the beam current needed for reading from and writing to the storage medium. As mentioned hereinbefore, however, in other applications, various other emitter types may be utilized.

During operation, a predetermined potential difference is applied between a field emitter 402 and a corresponding gate, such as a circular gate 410, which surrounds the emitter. So provided, an electron beam current is extracted from the emitter 402 towards the storage area 406. Depending upon the distance between the emitters 402 and the storage medium 404, the type of emitters, and the spot size (e.g., bit size) required, electron optics may be useful in focusing the electron beams. Voltage also may be applied to the storage medium 404 to either accelerate or decelerate the emitted electrons or to aid in focusing the emitted electrons. A casing 412 also may be provided which maintains the storage medium 404 in a partial vacuum.

FIG. 5 shows a top view of the cross-section A—A of FIG. 4 and illustrates the storage medium 404 being held by two sets of thin-walled microfabricated beams 514 and 516, and 518 and 520. Although a beam-type micromover is shown and described herein, various other types and configurations of micromovers may be utilized by the present invention. Faces of the first set of thin-walled beams, i.e., 514 and 516, are in the X-Z plane. This set of beams may be flexed in the X direction allowing the storage medium 404 to move in the X direction with respect to the casing 412. Faces of the second set of thin-walled beams, i.e., 518 and 520, are in the X-Z plane. This set of beams allows the storage medium 404 to move in the Y direction with respect to the casing 412. The storage medium is held by the first set of beams to a frame 522. The frame is held by the second set of beams to the casing 512. Thus, the field emitters may scan over the storage medium 404, or the storage medium may scan over the field emitters, in the X-Y directions by electrostatic, electromagnetic, piezoelectric or other suitable methods and/or mechanisms.

Figure 6:
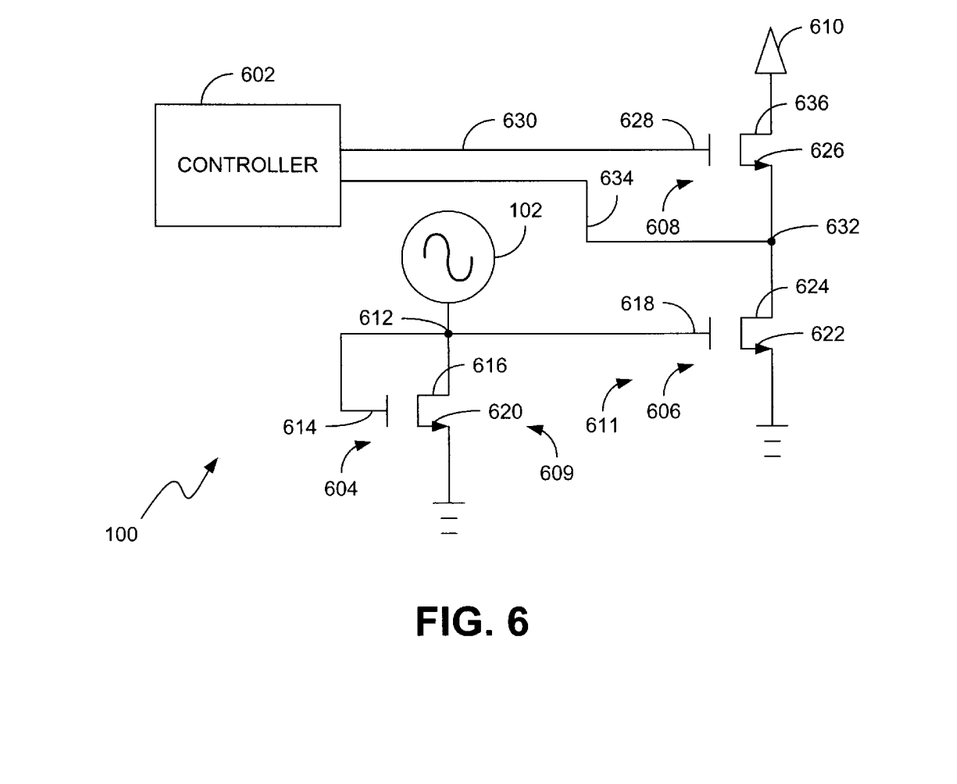
FIG. 6 is a schematic diagram depicting an embodiment of the control system of FIG. 1.

Referring now to FIG. 6, architecture and functionality of a preferred embodiment of the control system 100 of the present invention will be described in greater detail. As shown in FIG. 6, control system 100 includes a controller 602 and several transistors, e.g., transistors 604, 606, and 608. For example, and not for the purpose of limitation, the transistors may be field effect transistors. Current source 102 electrically communicates with the various transistors so as to form a current mirror for providing a predetermined current flow to an emitter(s), e.g., emitter 610.

In the embodiment depicted in FIG. 6, current source 102 provides current to a first stage 609, which may include one or more transistors, of the current mirror. First stage 609 then provides current to a second stage 611, which also may include one or more transistors, of the current mirror. Current from the second stage then is provided, via a component that functions as a switch, to the emitter. More specifically, current source 102 provides current to a node 612 that provides current to transistors 604 and 606. In particular, node 612 electrically communicates with gate 614 and drain 616 of transistor 604, and gate 618 of transistor 606. As respective sources 620 and 622 of transistors 604 and 606 are provided to ground, current provided from current source 102 to node 612 is provided via the current mirror to drain 624 of transistor 606.

Drain 624 of transistor 606 electrically communicates with source 626 of transistor 608. Transmission of current through transistor 608 preferably is facilitated by one or more control signals that are provided by controller 602. In the embodiment depicted in FIG. 6, a first control signal is provided to gate 628 of transistor 608 via path 630 and a second control signal is provided to node 632 via path 634. Node 632 is electrically disposed between drain 624 and source 626. So configured, appropriate control signals provided by controller 602 enable current, provided by current source 102, for example, to be provided to emitter 610 via drain 636 of transistor 608. Alternatively, when current is not to be provided to emitter 610, appropriate control signals (or lack thereof) may prevent current from flowing from transistor 608 to emitter 610. Thus, controller 602, in combination with transistor 608, may function as a switch for alternately permitting and preventing flow of current to emitter 610.

Spurious electrical changes typically encountered due to electrical characteristics of an emitter may be accounted for by providing control system 100. Thus, a predetermined current may be provided to the emitter in potential disregard of the transistor electrical characteristics of such an emitter.

Figure 7:
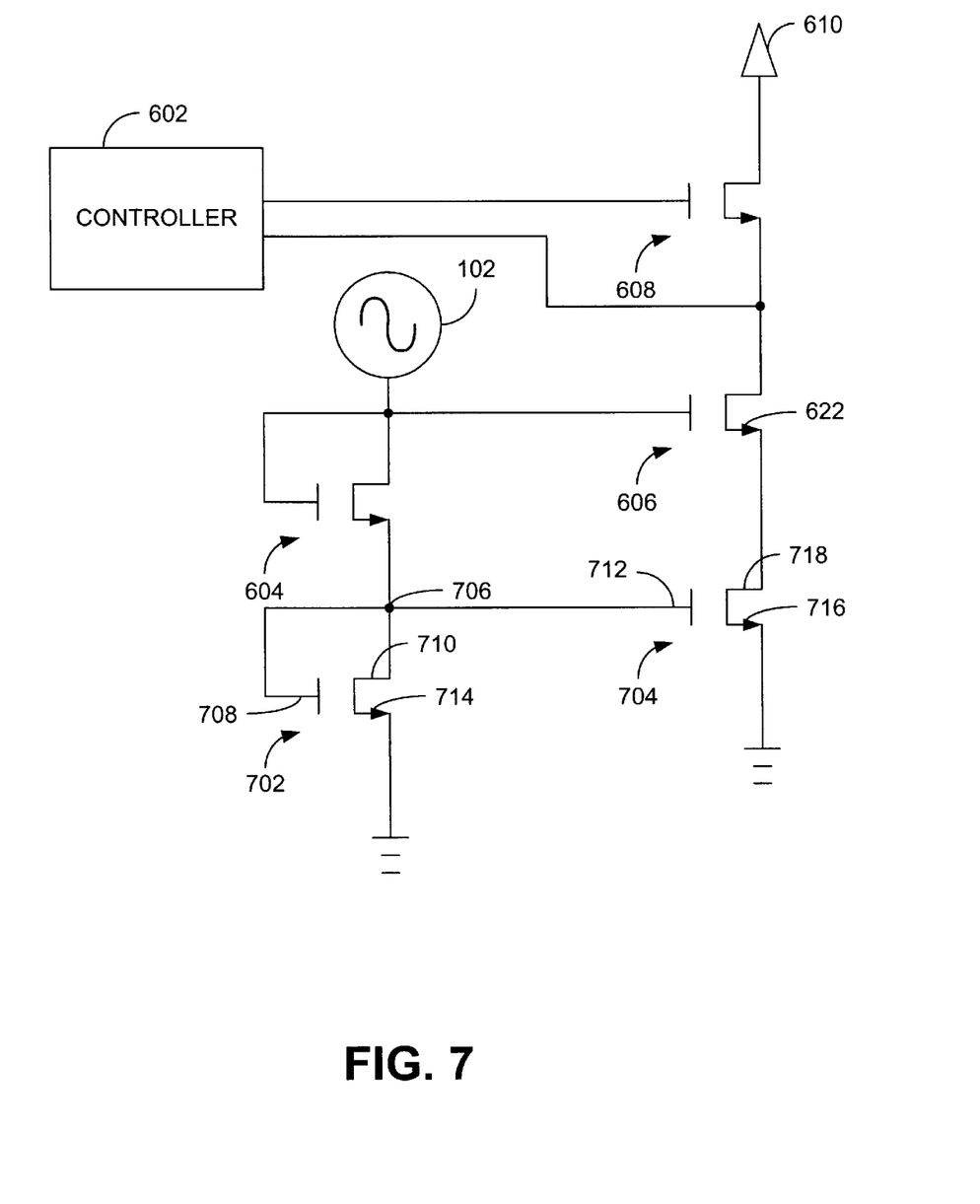
FIG. 7 is a schematic diagram depicting an alternative embodiment of the control system of FIG. 1.

Referring now to FIG. 7, it is shown that other embodiments of the control system 100 may incorporate a current-mirror configuration that utilizes more than two transistors that cooperate with an accompanying "switch" transistor. By way of example, the embodiment of the control system 100 depicted in FIG. 7 includes transistors 604, 606, and switch transistor 608, which can be a high voltage transistor, as well as transistors 702 and 704. In contrast to the embodiment depicted in FIG. 6, source 620 of transistor 604 is communicates with a node 706. Node 706 electrically communicates with gate 708 and drain 710 of transistor 702, as well as with gate 712 of transistor 704. Respective sources 714 and 716 of transistors 702 and 704 then are provided to ground. Additionally, drain 718 of transistor 704 electrically communicates with source 622 of transistor 606. So provided, current provided to transistor 604 and 702 is driven through transistors 704 and 606 so that the aforementioned four transistors form the current mirror. Utilizing more than two transistors to provide a current mirror may provide improved performance characteristics as current control may be enhanced as compared to utilizing merely two transistors. This additional control may be attributed to the transistors operating in a sub-threshold mode due to the typically low current values utilized during operation of a given emitter, such as during reading.

Figure 8:
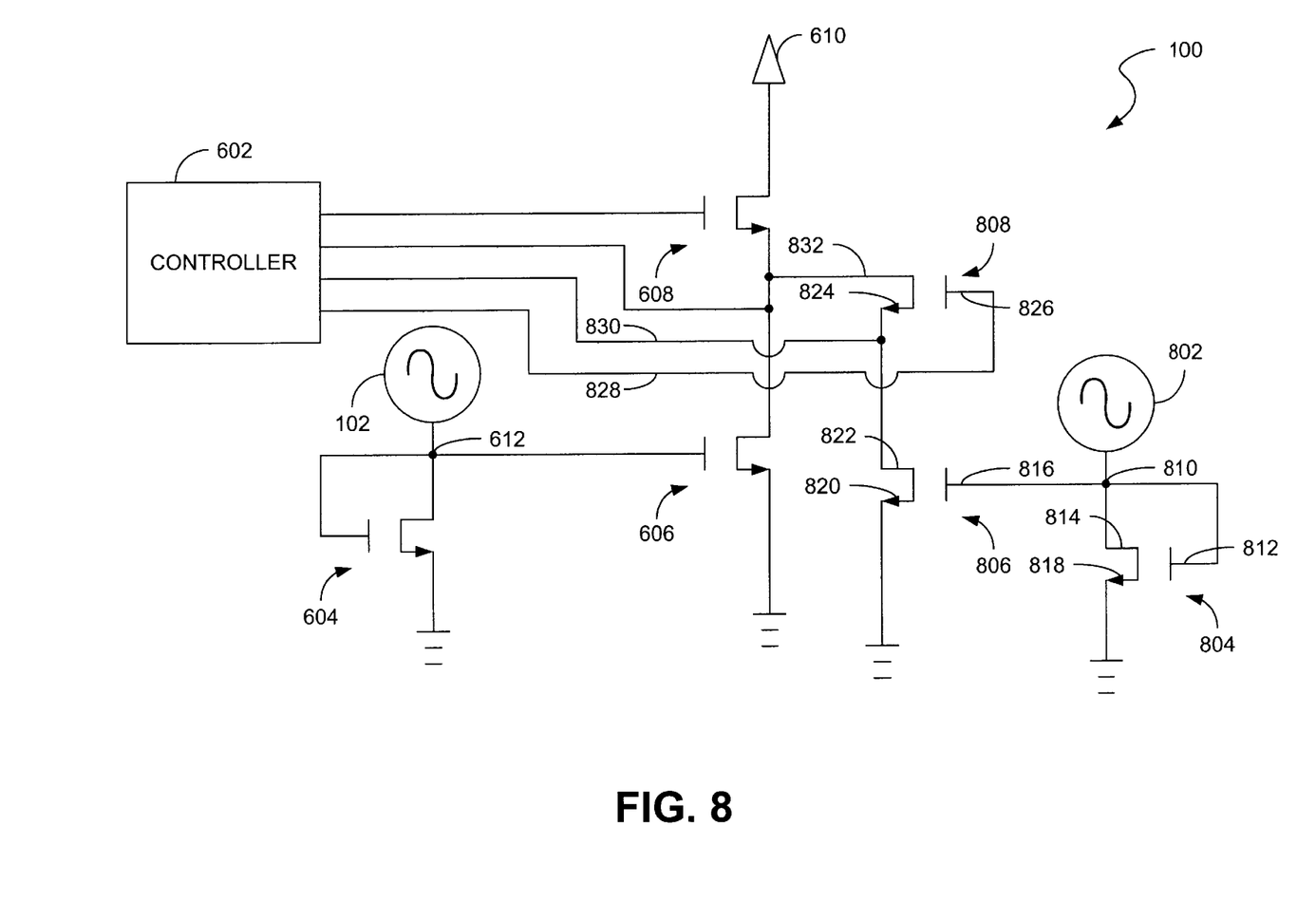
FIG. 8 is a schematic diagram depicting an alternative embodiment of the control system of FIG. 1.

Referring now to FIG. 8, an embodiment of control system 100 that is adapted for providing multiple current levels to an emitter will be described in greater detail. As depicted in FIG. 8, control system 100 incorporates a controller 602 and transistors 604, 606, and 608 that are configured much like that shown in the schematic diagram of FIG. 6. Additionally, the control system 100 of FIG. 8 includes a second current source 802. As mentioned hereinbefore, an emitter, e.g., emitter 610, maybe configured to read data from and write data to a storage medium. Typically, the functions of reading and/or writing are accomplished by varying the current flow provided to the emitter. In this regard, current source 102 may provide a first current value to emitter 610 via transistors 604 and 606, provided "switch" transistor 608 permits the current to be communicated to emitter 610. Thus, the aforementioned combination of source 102 and transistors 604, 606, and 608 may provide emitter 610 with a current value for performing the reading function, for example. However, when the writing function, for example, is to be performed, an increase in current typically is provided to the emitter. In this regard, additional current may be provided from current source 802, for example.

In the embodiment depicted in FIG. 8, current from current source 802 is provided to a node 810. Node 810 electrically communicates with gate 812 and drain 814 of transistor 804, as well as with gate 816 of transistor 806. As depicted in FIG. 8, respective sources 818 and 820 of transistors 804 and 806 are provided to ground. Drain 822 of transistor 806 electrically communicates with source 824 of transistor 808. Transistor 808 also electrically communicates with controller 602. In particular, a first control signal is provided to gate 826 of transistor 808 via path 828. Additionally, a second control signal is provided to source 824 of transistor 808 via path 830. So provided, transistor 808, in a manner similar to that previously described in regard to transistor 608, may function as a switch. More specifically, current provided to transistor 808 from source 802 may be selectively provided to transistors 608 via a path 832. So configured, when transistor 808 is "on" and transistor 608 is "on," current from sources 102 and 802 may be provided to emitter 610. Additionally, when transistor 808 then is switched "off," only the current provided by current source 102 is provided to emitter 610.

Figure 9:
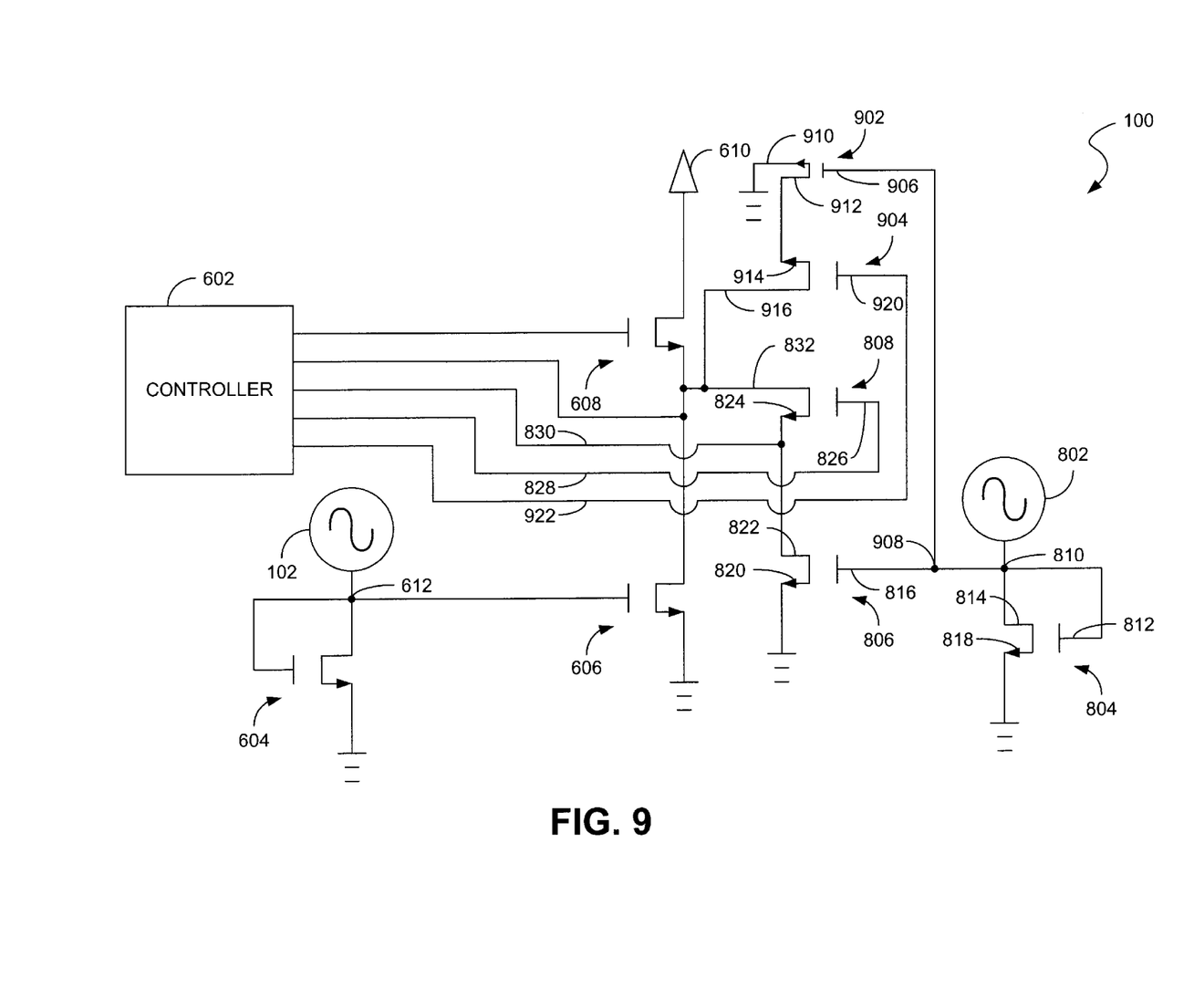
FIG. 9 is a schematic diagram depicting an alternative embodiment of the control system of FIG. 1.

Another embodiment of the control system 100 that is adapted for providing multiple current levels to an emitter will now be described with reference to FIG. 9. In FIG. 9, control system 100 incorporates a controller 602, transistors 604, 606, 608, 804, 806 and 808, and current sources 102 and 802 much like that shown in the schematic diagram of FIG. 8. Additionally, the control system 100 of FIG. 9 includes transistors 902 and 904.

As shown in FIG. 9, transistor 902 includes a gate 906 that electrically communicates with current source 802 via node 908. Source 910 of transistor 902 is provided to ground. Additionally, drain 912 of transistor 902 electrically communicates with source 914 of transistor 904. Drain 916 of transistor 904 electrically communicates with path 832 via node 918. Transistor 904 also electrically communicates with controller 602. In particular, a control signal is provided to gate 920 of transistor 904 via path 922. So provided, transistor 904 may function as a switch. More specifically, the control signal can enable current provided to transistor 902 from source 802 to be selectively provided to transistor 608 via a path 832. Thus, when transistor 904 is "on" and transistor 608 is "on," current from sources 102 and 802 may be provided to emitter 610.

It should be noted that transistor 902 can be adapted to pass a different current than that of transistor 806, for example. For instance, transistor 902 may be sized to provide a current that is 50% of the current provided by transistor 806. In this manner, transistors 808 and 904 can enable multiple current levels to be provided to the emitter from a single current source, i.e., source 802. In some embodiments, one of the aforementioned currents could be provided to the emitter to heat the material of the storage medium to a first temperature. When the other current or, alternatively, a summation of both currents is provided to the emitter, the material of the storage medium can be heated to a second temperature.

Embodiments of the controller 602 of the invention can be implemented in software (e.g., firmware), hardware, or a combination thereof. In a preferred embodiment, where the control system 10 is implemented in hardware, the control system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 10:
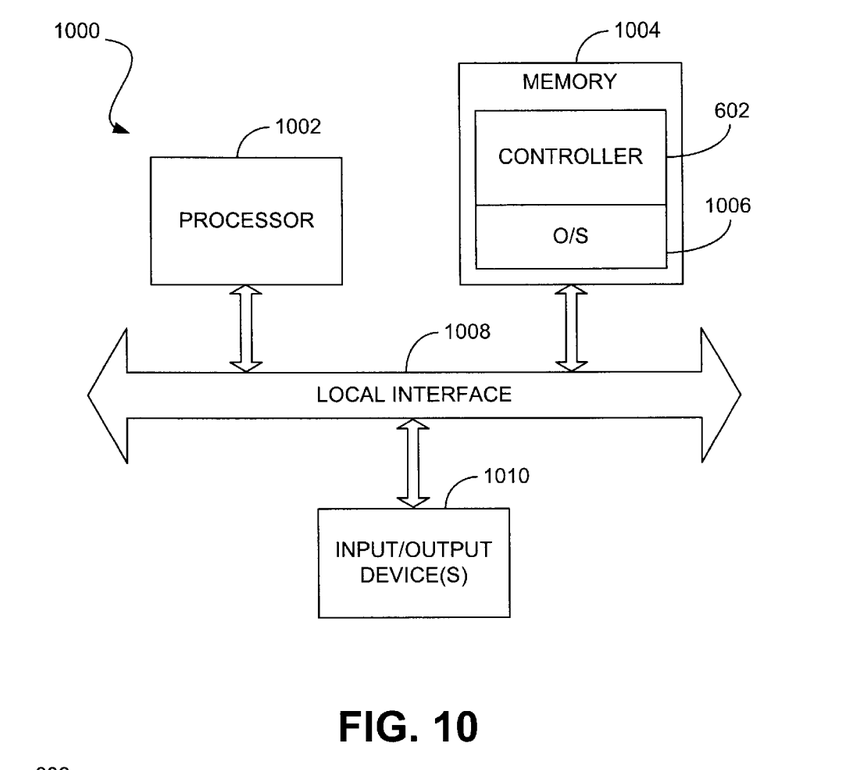
FIG. 10 is a schematic diagram of a computer or processor-based system which may be utilized by the controller of the present invention.

In some embodiments, the currently contemplated best mode, the control system is implemented in software, as an executable program, and is executed by a special or general purpose computer, such as a personal computer (PC; IBM-compatible, Apple-compatible, or otherwise), workstation, minicomputer, or mainframe computer. An example of a general purpose computer that can implement the control system of the present invention is shown in FIG. 10. In FIG. 10, the control system is denoted by reference numeral 602.

Generally, in terms of hardware architecture, as shown in FIG. 10, the computer 1000 includes a processor 1002, memory 1004, and one or more input and/or output (I/O) devices 1010 that are communicatively coupled via a local interface 1008. The local interface 1008 can be, for example but not limited to, one or more buses or other wired or wireless connections, as is known in the art. The local interface 1008 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1002 is a hardware device for executing software that can be stored in memory 1004. The processor 1002 can be any custom made or commercially available processor, a central processing unit (CPU) or an auxiliary processor among several processors associated with the computer 1000, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 1004 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 1004 may incorporate electronic, magnetic, optical, and/or other types of storage media. Note that the memory 1004 can have a distributed architecture, where various components are situated remote from one another, but can be accessed by the processor 1002.

The software in memory 1004 may include one or more separate programs, each of which comprises an ordered listing of executable instructions for implementing logical functions. In the example of FIG. 10, the software in the memory 1004 includes the control system and a suitable operating system (O/S) 1006. A nonexhaustive list of examples of suitable commercially available operating systems 1006 is as follows: a Windows operating system from Microsoft Corporation, U.S.A., a Netware operating system available from Novell, Inc., U.S.A., or a UNIX operating system, which is available for purchase from many vendors, such as Sun Microsystems, Inc., Hewlett-Packard Company, U.S.A., and AT&T Corporation, U.S.A. The operating system 1006 essentially controls the execution of other computer programs, such as the controller 602, and provides scheduling, input-output control, file and data management, memory management, and communication control and related services.

The I/O devices 1010 may include input devices, for example but not limited to, a keyboard, mouse, scanner, microphone, etc. Furthermore, the I/O devices 1010 may also include output devices, for example but not limited to, a printer, display, etc. Finally, the I/O devices 1010 may further include devices that communicate both inputs and outputs, for instance but not limited to, a modulator/demodulator (modem; for accessing another device, system, or network), an RF transceiver, a bridge, a router, etc.

If the computer 1000 is a PC, workstation, or the like, the software in the memory 004 may further include a basic input output system (BIOS) (omitted for simplicity). The BIOS is a set of essential software routines that initialize and test hardware at startup, start the O/S 006, and support the transfer of data among the hardware devices. The BIOS is stored in ROM so that the BIOS can be executed when the computer 1000 is activated.

When the computer 1000 is in operation, the processor 1002 is configured to execute software stored within the memory 1004, to communicate data to and from the memory 904, and to generally control operations of the computer 1000 pursuant to the software. The controller 602 and the O/S 1006, in whole or in part, but typically the latter, are read by the processor 1002, perhaps buffered within the processor 1002, and then executed.

When the controller 602 is implemented in software, as is shown in FIG. 10, it should be noted that the controller 602 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The controller 602 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 11:
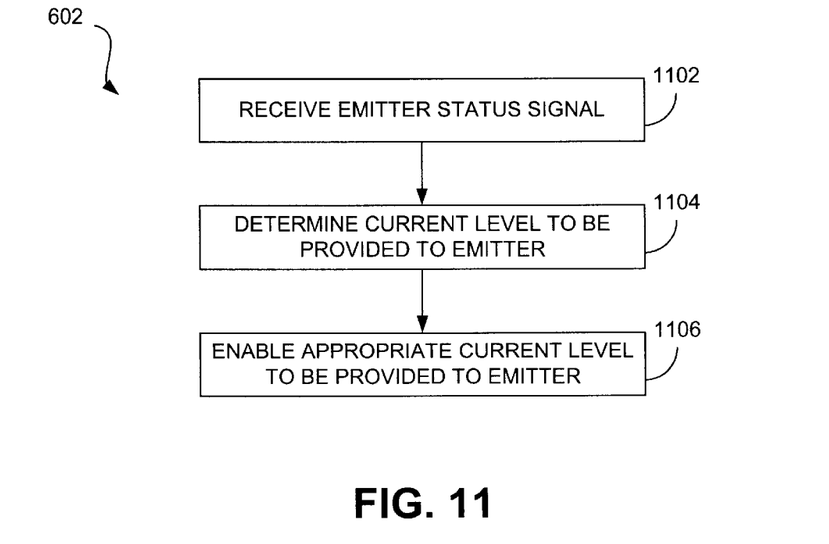
FIG. 11 is a flowchart depicting functionality of a preferred embodiment of the controller of FIG. 10.

Functionality of the embodiment of the controller or method 602 of FIG. 11 may be construed as beginning at block 1102 where an emitter status signal(s) is received. In block 1104, a current level to be provided to the emitter is determined. Preferably, a determination of the appropriate current level to be provided to the emitter may be based upon an evaluation of the emitter status signal(s). Thereafter, such as depicted in block 1106, providing the appropriate current level to the emitter is enabled.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A memory storage device comprising:

a storage medium having a plurality of coverage areas, each of said coverage areas having a storage area associated therewith, each of said storage areas being configurable in one of a plurality of structural states to represent information stored in said storage area;

a plurality of electron beam emitters configured to electrically communicate with said storage medium, said storage medium and said plurality of emitters being configured to move relative to each other such that each of said emitters is capable of providing a beam of electrons to a respective one of said coverage areas of said storage medium;

a first current source configured to selectively electrically communicate with at least one of said plurality of electron beam emitters so as to enable the at least one of said emitters to provide a beam of electrons to a respective one of said coverage areas; and a control system electrically communicating with said first current source, said control system configured to facilitate a controlled current flow from said first current source to the at least one of said emitters.

2. The memory storage device of claim 1, wherein the at least one of said emitters is a field emitter.

3. The memory storage device of claim 1, wherein said control system comprises:

a first current mirror electrically communicating with said first current source and the at least one of said emitters, said first current mirror having a first stage and a second stage, said first stage electrically communicating with said second stage, said first stage being configured to receive current from said first current source and provided current to said second stage, said second stage being configured to receive current from said first stage and to enable a controlled current to be provided to the at least one of said emitters, said controlled current corresponding to a predetermined current to be provided to the at least one of said emitters.

4. The memory storage device of claim 3, wherein said control system comprises:

a switch electrically communicating with said second stage, said switch being configured to selectively provide said controlled current to the at least one of said emitters.

5. The memory storage device of claim 3, wherein said control system comprises:

means for selectively providing said controlled current to the at least one of said emitters.

6. The memory storage device of claim 3, wherein said first stage has a first transistor and said second stage has a second transistor, said first transistor having a gate, a source, and a drain, said second transistor having a gate, a source, and a drain, said gate and said drain of said first transistor electrically communicating with said first current source and said gate of said second transistor, said source of said first transistor and said source of said second transistor being provided to ground.

7. The memory storage device of claim 3, wherein said control system comprises:

a second current source configured to selectively electrically communicate with the at least one of said emitters; and a second current mirror electrically communicating with said second current source and the at least one of said emitters, said second current mirror having a first stage and a second stage, said first stage electrically communicating with said second stage, said first stage being configured to receive current from said second current source and provided current to said second stage, said second stage being configured to receive current from said first stage and enable a controlled current to be provided to the at least one of said emitters, said controlled current corresponding to a predetermined current to be provided to the at least one of said emitters, wherein said control system is configured to selectively provided to the at least one of said emitters one of only said controlled current corresponding to said first current source, a summation of said controlled current corresponding to said first current source and said controlled current corresponding to said second current source, and no current.

8. The memory storage device of claim 3, wherein each stage of said first current mirror has multiple transistors.

9. The memory storage device of claim 4, wherein said control system comprises:

a controller electrically communicating with said switch, said controller being configured to enable said switch to selectively provide said controlled current to the at least one of said emitters.

10. The memory storage device of claim 4, wherein said switch is a transistor.

11. The memory storage device of claim 6, wherein said first transistor and said second transistor are field effect transistors.

12. The memory storage device of claim 7, wherein said controller comprises:

logic configured to selectively provide only said controlled current corresponding to said first current source to the at least one of said emitters so as to facilitate reading of information from said storage medium; and logic configured to selectively provide a summation of said controlled current corresponding to said first current source and said controlled current corresponding to said second current source to the at least one of said emitters so as to facilitate writing information to said storage medium.

13. The memory storage device of claim 9, wherein said controller comprises:

logic configured to enable said switch to selectively provide said controlled current to the at least one of said emitters.

14. The memory storage device of claim 13, wherein said logic is embodied on a computer-readable medium.

15. A method for providing current to an emitter of a memory storage device, the memory storage device having a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area, said method comprising:

providing a first current source and a first current mirror electrically communicating with the first current source;

controlling a current flow from the first current source to at least one of the emitters by:

providing current from the first current source to the first current mirror; and selectively providing current from the first current mirror to the at least one of the emitters.

16. The method of claim 15, wherein the step of selectively providing current from the first current mirror to the at least one of the emitters comprises the step of:

electrically interposing a switch between the first current mirror and the at least one of the emitters such that the switch enables the current provided from the first current mirror to be selectively provided to the at least one of the emitters.

17. The method of claim 15, further comprising the steps of:

providing a second current source and a second current mirror electrically communicating with the second current source;

controlling a current flow from the second current source to at least one of the emitters by:

providing current from the second current source to the second current mirror; and selectively providing current from the second current mirror to the at least one of the emitters.

18. The method of claim 17, further comprising the steps of:

selectively providing only current corresponding to the first current source to the at least one of the emitters so as to facilitate reading of information from the storage medium; and selectively providing a summation of current corresponding to the first current source and current corresponding to the second current source to the at least one of the emitters so as to facilitate writing information to the storage medium.

19. The method of claim 18, wherein the step of selectively providing a summation of current comprises the step of:

providing a switch electrically interposed between the second current mirror and the at least one of the emitters such that the switch enables current corresponding to the second current source to be summed with current corresponding to the first current source.

20. The method of claim 19, wherein the step of selectively providing a summation of current comprises the step of:

providing a controller electrically communicating with the switch, the controller being configured to provide at least one control signal to the switch such that, in response to the at least one control signal, the switch enables current corresponding to the second current source to be summed with current corresponding to the first current source.

* * * * *